M. C. OVERMAN.
WHEEL AND TIRE.
APPLICATION FILED SEPT. 18, 1911.
1,150,223.
Patented Aug. 17, 1915.
2 SHEETS—SHEET 1.
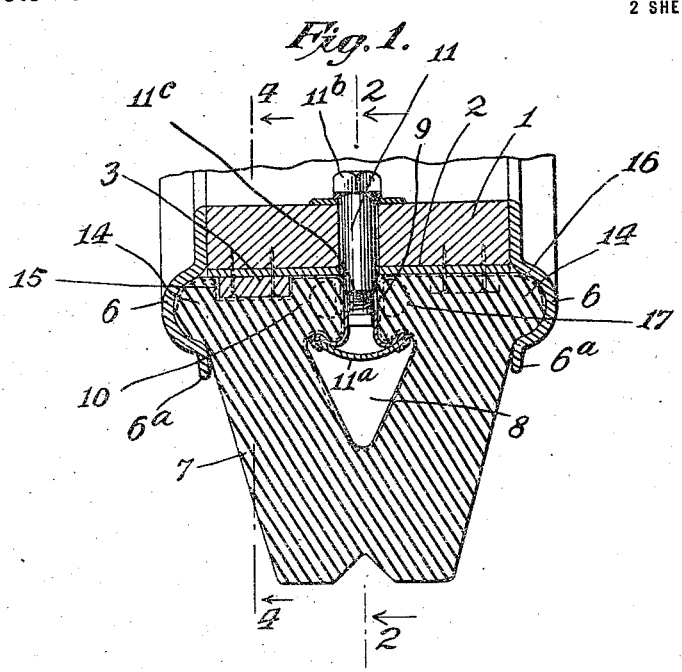
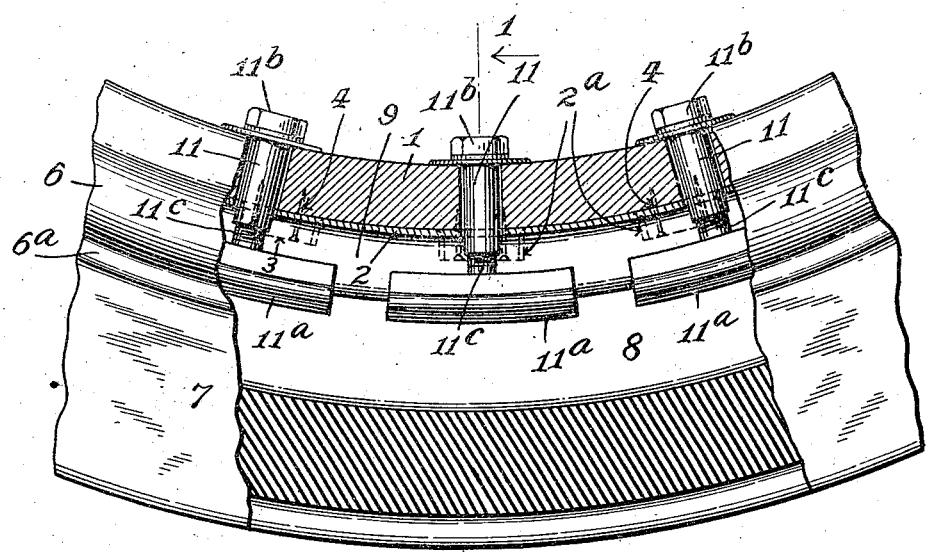
Attest:
Edna G. Moreland
Alan C. McDonnell
Inventor:
Max Cyrus Overman
by E. W. Scherr, Jr. his Atty

M. C. OVERMAN.
WHEEL AND TIRE.
APPLICATION FILED SEPT. 18, 1911.

1,150,223.

Patented Aug. 17, 1915.
2 SHEETS—SHEET 2.

Attest:
Edna A. Moreland
Alan C. McDonnell

Inventor:
Max Cyrus Overman
by E. W. Scherr, Jr. his Atty

UNITED STATES PATENT OFFICE.

MAX CYRUS OVERMAN, OF NEW YORK, N. Y.

WHEEL AND TIRE.

1,150,223.

Specification of Letters Patent.

Patented Aug. 17, 1915.

Application filed September 18, 1911. Serial No. 649,952.

*To all whom it may concern:*

Be it known that I, MAX CYRUS OVERMAN, a citizen of the United States, residing at New York, in the county of New York and State of New York, have invented certain new and useful Improvements in Wheels and Tires, of which the following is a specification.

My present invention relates to an improved means for securing rubber tires, especially of the cushion type, to vehicle wheels.

The advantages of my invention will be clear to those skilled in the art from an understanding of the following description in connection with the drawings. These show one of the forms which my invention is adapted to take, together with a slight modification.

Figure 3:
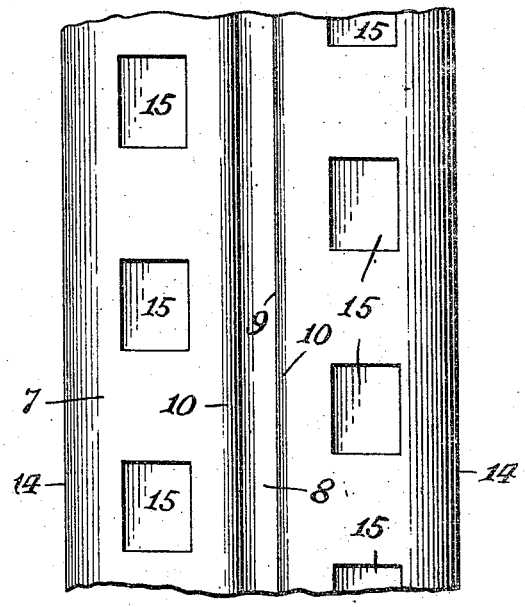
Figure 4:
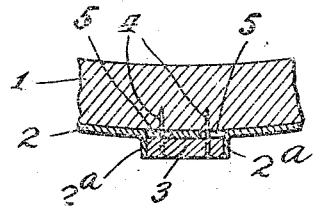
Figure 5:
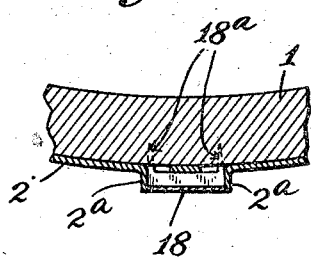
Figure 6:
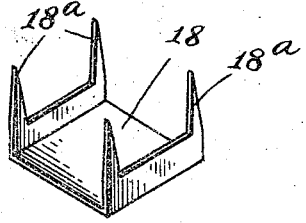

Figure 1 is a cross section, partly in elevation, through a tire and portion of a wheel showing a combination within my invention, namely, is a section on the line 1—1 in Fig. 2 looking in the direction of the arrows; Fig. 2 is a vertical longitudinal section partly in side elevation of the same tire and wheel-portion and is a section on the line 2—2 in Fig. 1 looking in the direction of the arrows; Fig. 3 is a plan view looking down upon the base of the tire after same has been detached from the wheel; Fig. 4 is a vertical section on the line 4—4 in Fig. 1 looking in the direction of the arrows to further illustrate the means for securing the socket-occupying members or blocks to the felly; Fig. 5 is a view similar to Fig. 4 modified to the extent of substituting for the block another form of socket-occupying member; and Fig. 6 is a perspective view on a larger scale of this new form of socket-occupying member.

I will now describe the devices of the drawings, reserving it to the claims to point out the novel features and to define the scope of the invention, it being understood that the claims will be given the due range of equivalents to which they may be entitled in view of the art.

In the drawings, 1 designates the wooden felly of the wheel; 2 is a metal hoop or rim encircling the felly, said hoop having lugs 2ª (compare Figs. 2 and 4) bent up from it in pairs in longitudinal series around the outside of the hoop. 3 designates wooden blocks which fit one between each pair of the lugs 2ª. They are secured in this position by nails 4 driven through blocks into the felly, said nails passing through the spaces 5 in the hoop (see Fig. 4) originally occupied by the lugs before they were bent up. It will be noted that there are two longitudinal series of the aforesaid pairs of lugs and blocks, one series on each half of the felly, and that they are in staggered arrangement relative to each other.

6—6 are flanges which retain the outer sides of the tire 7 at its base. This tire is of the non-pneumatic or cushion type, and the form of its tread and the contour of its sides form no part of the present invention and may vary along with other features of the tire.

8 is a longitudinal opening through the tire.

9 is a longitudinal split through the base of the tire leading to the tire opening 8. This word "split" as used in this specification is not to be taken as implying that this passage is cut through, since in the preferred actual manufacture of the tire it is formed by a core in the mold, although it might, of course, be formed otherwise. Further, it will be understood that the actual tire will be about twice the size shown in the drawings. Consequently, the split 9 is about a half inch wide.

10—10 are clamping portions on the tire which project inwardly toward each other from the base of the walls of the tire. They are so called because they are the portions of the tire which are engaged by the clamping means 11. This consists of a plurality of clamping plates 11ª located within the tire opening 8 and each connected with the felly by a nut 11ᵇ engaging a threaded stem or bolt 11ᶜ on the plate 11ª. These clamping means are disposed as usual in a longitudinal series around the wheel in medial position; and a corresponding series of bolt holes are provided through the felly 1 and the metal hoop 2 to receive the several bolt means connecting the clamping plates with the felly. When the nuts 11ᵇ are screwed up, the plates 11ª of course clamp the portions 10 of the tire to the wheel.

14—14 designate outwardly projecting beads at the base of the tire which are received into the recesses formed for this purpose in the flanges 6. Free edges 6ᵉ of the flanges below the recesses are preferably normally out of contact with the sides of the tire as shown in Fig. 1 to diminish the liability of cutting or abrading the tire at this point.

Each half of the base of the tire is provided with a longitudinal series of sockets 15 (compare Figs. 1, 2 and 3). These are shown rectangular in form arranged in the same staggered relation as the lugs and blocks 3 on the felly so as to receive these into the sockets when the tire is in place on the wheel. The sockets 15 are shown in rectangular form and are molded into the base of the tire.

The dotted line 16 in Fig. 1 indicates a layer of canvas molded into the tire flush with its surface and 17 designates rolls of canvas molded into the tire to extend lengthwise through the clamping portions 10. However, both these features are merely described because they are shown in the drawings but are not here claimed. Describing now the operation of the aforesaid devices, it will be seen, when the tire is mounted on the wheel as shown in Figs. 1 and 2, that the tire cannot tear loose in any direction. The sockets 15 and blocks 3 being wide are so near at their sides to the clamping means 11 and the flange 6 that constricted necks are formed at the portions of the tire which intervene between the sockets and the clamping means on the one side and the flange on the other. This securely locks the beads 14 and the clamping portions 10 of the tire to the wheel. This construction would weaken the tire if the depressions 15, instead of being true sockets, continued around the tire in the form of wide channels. This, however, I have guarded against by isolating the depressions and making them true sockets. Furthermore, for the same reason, viz: of added strength, I prefer to locate the sockets 15 in staggered arrangement on the two halves of the tire.

Creeping of the tire is, of course, absolutely prevented by the fact that the lugs 2ª and blocks 3 project down into the sockets 15 and receive against them the longitudinal thrust of the tire when same is in motion.

The modification shown in Figs. 5 and 6 consists merely in substituting the blocks 3 by another form of socket-occupying member 18 consisting of a piece of sheet metal, preferably steel, bent up in the form shown with sharp prongs 18ª. This member is shown in use in Fig. 5 and like the block 3 is received between the lugs 2ª with its prongs 18ª passing through the spaces left in the metal hoop 2 and driven into the wooden felly 1. These modified members, of course, function precisely like the block 3.

What I claim is:

1. The combination of a tire having a longitudinal opening through it with side walls adjacent said opening, said walls at their base having inwardly projecting clamping portions, flanges retaining the outer sides of the tire at its base, clamping plate means within the longitudinal opening of the tire, and means for drawing said means to the wheel periphery to clamp the aforesaid inwardly directed clamping portions thereto, each half of the base of the tire having a longitudinal series of sockets, and the wheel periphery having a longitudinal series of projections corresponding to and fitting into said sockets, the sockets being near enough in transverse direction to the clamping means and to the given flange to form constricted necks at the portions of the tire which intervene between the sockets and the clamping means on the one side and the flange on the other.

2. The combination of a tire having a longitudinal opening through it with side walls adjacent said opening, said walls at their base having inwardly projecting clamping portions, flanges retaining the outer sides of the tire at its base, clamping plate means within the longitudinal opening of the tire, and means for drawing said means to the wheel periphery to clamp the aforesaid inwardly directed clamping portions of the tire thereto, each half of the base of the tire having a longitudinal series of wide sockets, and the wheel periphery having a longitudinal series of members corresponding to and received into said sockets when the tire is in place on the wheel periphery, the sockets in the two halves of the base of the tire having a staggered arrangement relative to each other.

3. The combination of a tire having a longitudinal opening through it with side walls adjacent said opening, said walls at their base having inwardly projecting clamping portions, each half of the base of the tire having a longitudinal series of sockets, a felly, a metal hoop encircling the felly having lugs bent up in pairs therefrom in longitudinal sequence around the outside of the hoop, socket-occupying members secured one between each pair of lugs, said members and lugs being located to correspond with and occupy the aforesaid sockets in the base of the tire, flanges retaining the outer sides of the tire at its base, and clamping plate means within the longitudinal opening of the tire, and means for drawing said means to the felly to clamp the aforesaid inwardly directed clamping portions of the tire to the felly.

4. The combination of a tire having a longitudinal opening through it with side walls adjacent said opening, said walls at their base having inwardly projecting clamping portions, each half of the base of the tire having a longitudinal series of sockets, a wooden felly, a metal hoop encircling the felly having lugs bent up in pairs therefrom in longitudinal sequence around the outside of the hoop, socket-occupying members secured one between each pair of lugs, said members and lugs being located to correspond with and occupy said sockets, means for securing the socket-occupying members to the felly, said means passing through the openings in the metal hoop which were originally occupied by the lugs before they were bent up, flanges retaining the outer side of the tire at its base, clamping plate means within the longitudinal opening of the tire, and means for drawing said means to the felly to clamp the aforesaid inwardly directed clamping portions of the tire to the felly.

In testimony whereof I affix my signature in presence of two witnesses.

MAX CYRUS OVERMAN.

Witnesses:
E. W. SCHERR, Jr.,
ALAN C. McDONNELL.